United States Patent
Jordan

(10) Patent No.: US 12,054,102 B1
(45) Date of Patent: Aug. 6, 2024

(54) SOUND BAR FOR MOUNTING ON A RECREATIONAL VEHICLE OR WATERCRAFT

(71) Applicant: SOUTHERN AUDIO SERVICES, INC., Baton Rouge, LA (US)

(72) Inventor: Jeff Jordan, Baton Rouge, LA (US)

(73) Assignee: SOUTHERN AUDIO SERVICES, INC., Baton Rouge, LA (US)

( * ) Notice: Subject to any disclaimer, the term of this patent is extended or adjusted under 35 U.S.C. 154(b) by 0 days.

(21) Appl. No.: 18/222,287

(22) Filed: Jul. 14, 2023

Related U.S. Application Data

(63) Continuation of application No. 17/883,963, filed on Aug. 9, 2022, now Pat. No. 11,745,669, which is a
(Continued)

(51) Int. Cl.
*H04R 25/00* (2006.01)
*B60R 11/02* (2006.01)
(Continued)

(52) U.S. Cl.
CPC ...... *B60R 11/0217* (2013.01); *F21V 33/0056* (2013.01); *H04R 1/026* (2013.01);
(Continued)

(58) Field of Classification Search
CPC .......... H04R 1/026; H04R 1/025; H04R 1/02; H04R 5/02; H04R 2499/13; H04R 1/18; H04R 1/326; H04R 1/403; H04R 3/00; H04R 5/023; H04R 29/007; H04R 2201/025; H04R 2201/028;
(Continued)

(56) References Cited

U.S. PATENT DOCUMENTS 5,191,177 A * 3/1993 Chi .......................... H04R 5/02
181/156
5,979,590 A * 11/1999 Telmos .................. H04R 1/025
181/150
(Continued)

OTHER PUBLICATIONS

SAS Bracket; (posted Jun. 22, 2015); (Last visited, Mar. 8, 2024); https://www.youtube.com/watch?v=pWwKTEm8PcA.
(Continued)

*Primary Examiner* — Gerald Gauthier
(74) *Attorney, Agent, or Firm* — ROY KIESEL FORD DOODY & NORTH, APLC

(57) ABSTRACT

A sound bar having a mounting assembly configured to pivotally secure the bar. The sound bar includes an elongated, at least partially hollow, housing. The housing has a body extending between two opposing ends. A speaker array is positioned in the body. At least one speaker is positioned in at least one end of the bar. The end speaker(s) are preferably bass speakers in fluid communication with the hollow housing. A grill is preferably positioned over at least one of the housing ends. The grill preferably has a center hub affixed to an outer rim by spokes defining open spaces in the grill to facilitate the emission of sound. A mount is attached to the sound bar to secure the bar to a structure while allowing the bar to pivot along its longitudinal axis. Preferably, the mount is secured to the center hub of the grill.

10 Claims, 18 Drawing Sheets

Related U.S. Application Data continuation of application No. 17/229,490, filed on Apr. 13, 2021, now Pat. No. 11,407,362, which is a continuation of application No. 16/599,438, filed on Oct. 11, 2019, now Pat. No. 11,285,885, which is a continuation of application No. 15/860,872, filed on Jan. 3, 2018, now Pat. No. 10,471,903.

(60) Provisional application No. 62/442,245, filed on Jan. 4, 2017.

(51) Int. Cl.
  *F21V 33/00* (2006.01)
  *H04R 1/02* (2006.01)
  *H04R 1/18* (2006.01)
  *H04R 1/40* (2006.01)
  *F21Y 115/10* (2016.01)

(52) U.S. Cl.
  CPC ............... *H04R 1/18* (2013.01); *H04R 1/403* (2013.01); *F21Y 2115/10* (2016.08); *H04R 2201/025* (2013.01); *H04R 2201/028* (2013.01); *H04R 2201/403* (2013.01); *H04R 2499/13* (2013.01)

(58) Field of Classification Search
  CPC ........... H04R 2201/403; B60R 11/0217; F21V 33/0056; F21Y 2115/10; H04S 3/008
  See application file for complete search history.

(56) References Cited

U.S. PATENT DOCUMENTS

| | | | |
|---|---|---|---|
| D599,326 S * | 9/2009 | Martikainen | D14/216 |
| 9,119,012 B2 * | 8/2015 | Ikizyan | H04R 3/00 |
| 9,469,254 B1 * | 10/2016 | White | H04R 1/026 |
| 9,794,710 B1 * | 10/2017 | Sheen | H04R 29/007 |
| 9,877,096 B2 * | 1/2018 | Harms | F16M 13/022 |
| 10,225,676 B2 | 3/2019 | Lando et al. | |
| 10,471,903 B1 * | 11/2019 | Jordan | B60R 11/0217 |
| 11,285,885 B1 * | 3/2022 | Jordan | F21V 33/0056 |
| 11,407,362 B1 * | 8/2022 | Jordan | B60R 11/0217 |
| 11,745,669 B1 * | 9/2023 | Jordan | H04R 1/18 381/389 |
| 2004/0129065 A1 | 7/2004 | Plote et al. | |
| 2007/0117925 A1 | 5/2007 | Strickler et al. | |
| 2010/0158299 A1 | 6/2010 | Liu | |
| 2010/0226506 A1 * | 9/2010 | Bayes | H04R 5/023 381/86 |
| 2013/0329413 A1 | 12/2013 | Cotta, Sr. et al. | |
| 2014/0294195 A1 * | 10/2014 | Perez | H04R 5/02 381/86 |
| 2016/0066115 A1 * | 3/2016 | Park | H04S 3/008 381/302 |
| 2016/0286316 A1 * | 9/2016 | Bleacher | B60R 11/0217 |
| 2017/0021768 A1 * | 1/2017 | Jaegal | H04R 1/326 |
| 2017/0359654 A1 * | 12/2017 | Kaplan | H04R 1/026 |

OTHER PUBLICATIONS

AUXMART Bracket; (first available May 26, 2016); (Last visited, Mar. 8, 2024); https://www.amazon.com/AUXMART-Mounting-Brackets-Universal-Straight/dp/B00XY6WQDQ/ref=sr_1_42?crid=RA48PYLO55KOkeywords=led+bar+side+bracket&qid=1702567000&sprefix=led+bar+side+bracket,aps, 137&sr=8-42.

* cited by examiner

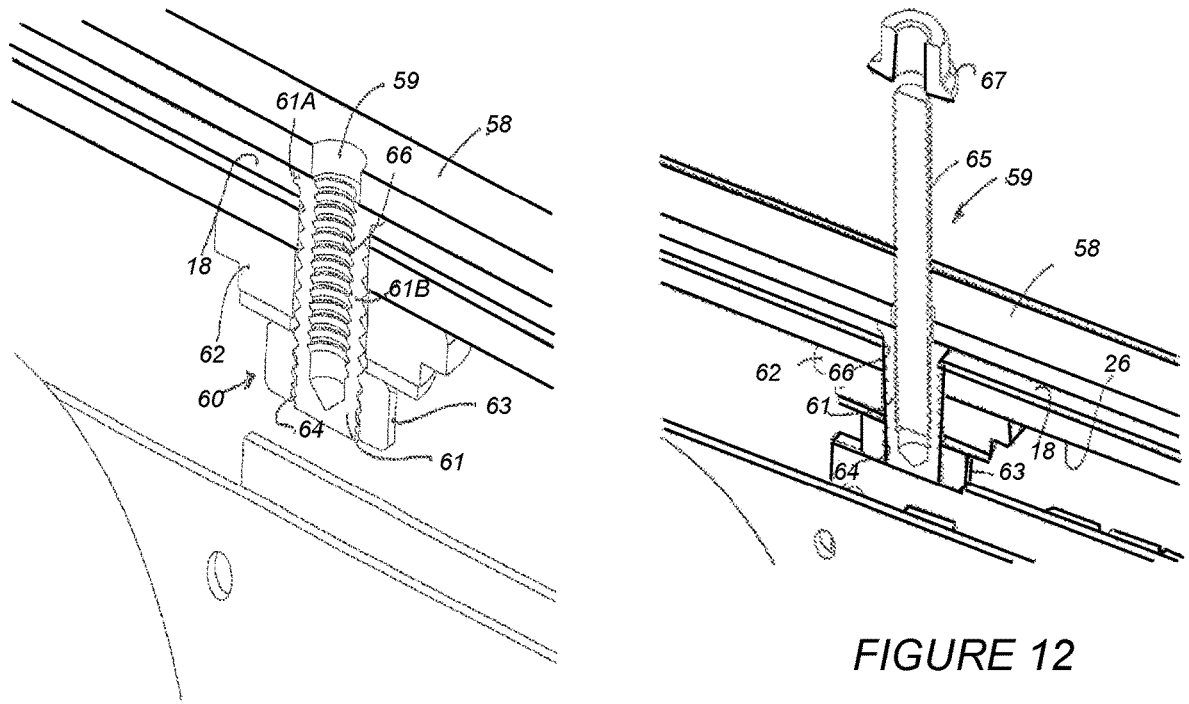
FIGURE 11
FIGURE 12
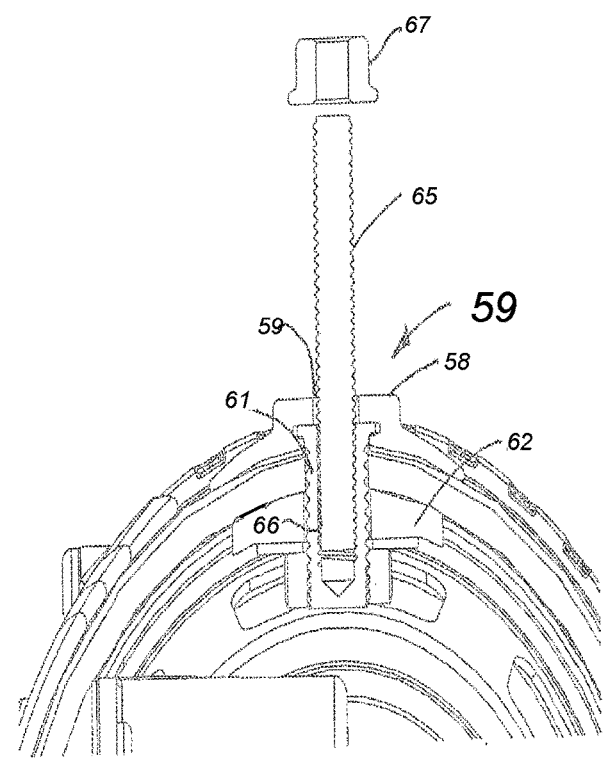
FIGURE 13

SOUND BAR FOR MOUNTING ON A RECREATIONAL VEHICLE OR WATERCRAFT

PRIORITY

This application is a continuation of and claims priority to U.S. patent application Ser. No. 17/883,963, which was filed on Aug. 9, 2022, which claimed priority to U.S. patent application Ser. No. 17/229,490, which was filed on Apr. 13, 2021, now U.S. Pat. No. 11,407,362, which claimed priority to U.S. patent application Ser. No. 16/599,438, now U.S. Pat. No. 11,285,885 which was filed on Oct. 11, 2019, which claimed priority to U.S. patent application Ser. No. 15/860,872, which was filed on Jan. 3, 2018, and is now U.S. Pat. No. 10,471,903 and which claimed priority to U.S. Provisional application 62/422,245, which was filed on Jan. 4, 2017, all of which are hereby incorporated by reference in their entirety.

SPECIFICATION

Field of the Invention. This invention relates in general to sound bars, and more specifically to sound bars for mounting on recreational land vehicles or on recreational marine vessels.

Prior Art. Successfully adopting a sound bar for attachment to various recreational land vehicles, particularly off-road vehicles such as an ATV, dune buggies and similar land vehicles, as well as marine vessels such as ski boats, off-shore recreational fishing boats, party barges and similar watercraft, requires overcoming various problems unique to these land vehicles and watercraft. Because these land vehicles and watercraft are traveling over bumpy terrain such as dusty or muddy trails or over choppy water, the sound bar will undergo vigorous physical shaking and jolting requiring very secure attachment to the land vehicle or watercraft, as well as being constructed to withstand significant mechanical impact. At the same time the sound bar electrical components must remain both dustproof and watertight to prevent damage from splashed water, mud, rain or waves.

In addition because the sound bar will in many instances broadcast in open air while the land vehicle or watercraft is moving and not in a closed environment such as a home TV room. As a result it is difficult to achieve the desired directionality of the sound broadcast by the speakers. This requires that the position and directionality of the speakers be easily and quickly adjustable to accommodate changes in the listening environment. In many cases this difficulty is compounded because of the location where the sound bar must be mounted. Still further, because much of the broadcasting is into large open spaces there are many competing and uncontrollable sounds that interfere with the quality of the broadcast sound. Also, if the land vehicle or watercraft is moving during the broadcasting additional competing noises are created by the land vehicle or watercraft and by the wind passing over the moving various parts of the land vehicle or watercraft. The sound bar must be able to not only overcome these competing noises, but also maintain a high perception of sound quality from the listeners. As a result adjustments may be needed to the sound producing components. However in many instances, the position of the secured sound bar may make manual adjustments of the sound producing components difficult.

A further problem with prior art sound bars is they do not mount mid-range and tweeter speakers in both the front and rear sides of the sound bar housing middle section. Nor do they mount bass speakers in the opposing end sections of the sound bar housing such that the broadcast sound can be directed outward from the ends and generally perpendicular to the direction of sound being emitted from the other speakers in the speaker array assembly. Still further, prior art sound bars do not provide mounting assemblies attached across the open ends of the housing end section that can enable the mounting assemblies to be rotated up to 360 degrees after the sound bar has been mounted to a recreational land vehicle or watercraft.

Another problem is the difficulty in modifying the broadcast (e.g., volume, sound source, etc.) during the operation of the land vehicle and watercraft. This modification is made even more difficult at night when there may be limited light for the sound bar operator to make such modifications.

Attempts have been made to construct sound bars to be mounted to various types of recreational vehicles and marine vessels. For example, the sound bar described in U.S. Pat. No. 9,469,254 is directed to a sound system for mounting on off-road land vehicles, such as ATVs, motorcycles, and watercraft. Although such prior art devices have addressed some of the prior art problems, there remains a need in the industry for a positional and directional adjustable multi-range sound bar operational in the dust and wet conditions encountered by an off-road vehicle or watercraft that can better reduce or eliminate these prior art problems, as well as to control the functions of the sound bar.

OBJECTS OF THE INVENTION

An object of the invention to provide a sound bar constructed to meet mechanical impact resistance standards that when secured to a recreational vehicle or watercraft can undergo vigorous shaking and jolting without becoming damaged.

Another object of the invention is to provide a sound bar having electrical and electronic components that are sealed to limit or eliminate dust ingress and water ingress within the sound bar to the extent not to damage or interfere with the functions of the speakers or their controls.

A still further object of the invention is to provide a mounting system for the sound bar, including its broadcasting components, that can easily and quickly be adjusted to provide the desired position and directionality of the speakers, as well as to change or modify the different functions of the sound bar and to sufficiently overcome extraneous noise to produce an acceptable sound quality for the listeners.

Another object of the invention is to provide a mounting system for the sound bar permitting the sound bar to be rotated and affixed at any point in the 360° rotation about the longitudinal axis of the sound bar.

Another object of the invention is to provide a sound bar mounting assemblies positioned at opposite ends of the sound bar and constructed not to interfere with the quality of the sound being broadcast from the opposite ends of the sound bar.

A further object of the invention is to provide a sound bar that includes a lighting assembly while maintaining the desired dust and water ingress prevention standards desired.

A still further objective of the invention is to provide a sound bar control module that is hardwired to a control panel affixed to the sound bar housing, or is RF and/or Bluetooth enabled to communicate with a control panel affixed to the vehicle or watercraft or control panel which is handheld, and is RF and Bluetooth enabled to communicate with a smart phone app speaker control panel providing control signals to operate the speakers and lights of the sound bar.

These and other objects and advantages of the invention will become obvious from the drawings and written description of the preferred embodiments of the invention set forth below.

SUMMARY OF THE INVENTION

Accordingly, a sound bar for attachment to a recreational vehicle or watercraft comprising an elongated hollow housing having a generally circular or polygon cross-section along a central longitudinal axis, and including a first end section and an opposite second end section separated by a middle section; the sections forming an interior passageway sized to contain (i) a first array assembly of mid-range and tweeter speaker units positioned in the middle section to emit sound in a direction outward from the central longitudinal axis, (ii) a first bass speaker unit positioned in the first end section to emit sound outward from a first end opening of the first section of the housing in a first direction generally along the central longitudinal axis, and (iii) a second bass speaker unit positioned in the second end section to emit sound outward from a second end opening of the second section of the housing in a second direction generally along the central longitudinal axis and opposite the first direction; a first grill member attached to the first end section and extending over the first end opening, the first grill member constructed having a center hub area affixed to an outer perimeter section of the first grill member by spokes defining open spaces in the first grill member to permit sound to emit from the first bass speaker unit and out of the first end opening; and a second grill member attached to the second end section and extending over the second end opening, the second grill member constructed having a center hub area affixed to an outer perimeter section of the second grill member by spokes defining open spaces in the second grill member to permit sound to emit from the second bass speaker unit and out of the second end opening. In a preferred embodiment the sound bar further includes a second array assembly having mid-range and tweeter speaker units positioned in the middle section to emit sound in a direction outward from the central longitudinal axis and opposite from the direction of sound emitted by the first array assembly.

In another preferred embodiment the sound bar further includes a first ring of lights affixed to an inside surface of the first center hub area and operatively connectable to a power source, as well as a LED lighting strip operatively affixed to housing outer surface.

In another preferred embodiment the sound bar includes a mounting strip operatively mounted to the exterior housing surface area and which includes a blind insert assembly having an insert threaded both internally and externally for attaching the mounting strip to the housing wall and for attaching the sound bar to a recreational vehicle or watercraft. In another preferred embodiment the sound bar includes a first generally L-shaped leg member rotatable affixed to the first center hub area and a second generally L-shaped leg member rotatable affixed to the second center hub area; each L-shaped leg member comprising an elongated plate member having a hub receiving area positioned at a top end section of the elongated plate member, shaped to affix to its corresponding center hub area and having a shorter plate member affixed generally perpendicularly to the bottom end section of the elongated plate member. It is preferred that each of the center hub areas comprises a centrally located threaded opening surrounded by a raised shoulder having an upper surface formed having a ring of ridges separated a predetermined distance; each of the hub receiving areas comprises a centrally located opening surrounded by a first ring of ridges separated by the predetermined distance; and a bolt for each of the center hub areas sized to extend through the centrally located opening and into the centrally located threaded opening to operatively affix the hub receiving area to the center hub area when the bolt is screwed into the centrally located threaded opening.

In yet another preferred embodiment the sound bar includes a control module operatively attachable to a power source, the control module also being operatively connected to the speaker units to control the volume of sound emitted by the speaker units, the control module having RF and Bluetooth enabled electronic components to receive operating signals from a remote control panel. It is preferred the RF and Bluetooth enabled electronic components transmit information signals to the remote control panels.

BRIEF DESCRIPTION OF THE DRAWINGS

FIGS. 11-13 are partial cross-section views illustrating the blind inserts utilized to achieve a dust proof and watertight seal utilized to secure the attaching rail to the sound bar housing.

PREFERRED EMBODIMENT OF THE INVENTION

Figure 1:
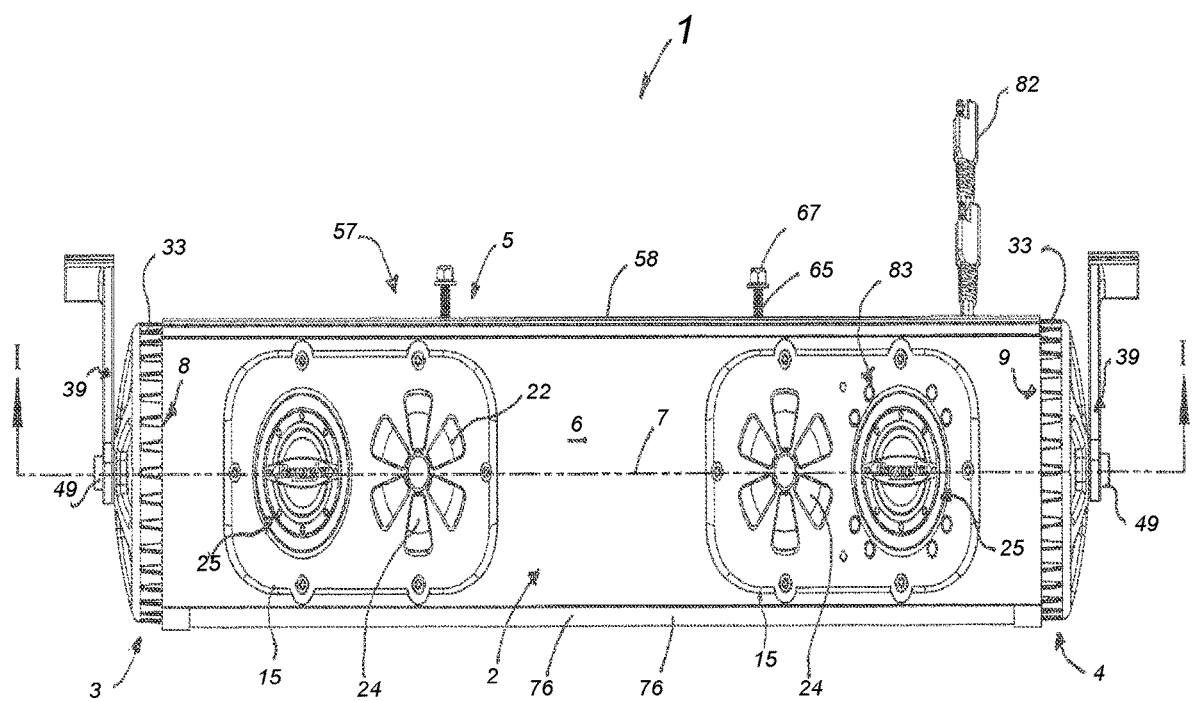
FIGS. 1-4 are front view, rear view, bottom view and top view, respectively, of one preferred embodiment of the sound bar of this invention having a bass speaker in each end section of the housing and four arrays of mid-range and tweeter speakers in the middle section of the housing.

Referring now to FIGS. 1-7, in the preferred embodiments, a sound bar 1 for attachment to a recreational land vehicle or watercraft is disclosed including an elongated hollow housing 2, preferably having a generally circular or polygonal cross-section. The housing 2 includes a first end section 3 and an opposite second end section 4 separated by a middle section 5. These three housing sections 3, 4 and 5 form an interior passageway 6 having a central longitudinal axis 7 extending through the center of opposing end openings 8, 9 of passageway 6. Passage way 6 is sized to permit a first bass speaker unit 10 to be positioned in end opening 8 and affixed to housing 2 in a manner to seal opening 8 with the bass speaker diaphragm or face 11 facing outward along axis 7. Similarly, passageway 6 is sized to permit second bass speaker unit 12 to be positioned in end opening 9 and affixed to housing 2 in a manner to seal end opening 9 with the bass speaker diaphragm or face 13 facing outward along axis 7 and in a direction opposite bass speaker face 11.

The housing middle section 5 is provided with one or more openings 14 to accommodate positioning a speaker array assembly 15. Speaker array assembly 15 includes a face plate 16 sized to fit over opening 14 and be sealing attached thereto by a series of screws 17. In a preferred embodiment the housing outer surface 18 will be constructed of a compressible material to form a watertight and dust proof seal between housing outer surface 18 and face plate 16.

Figure 5:
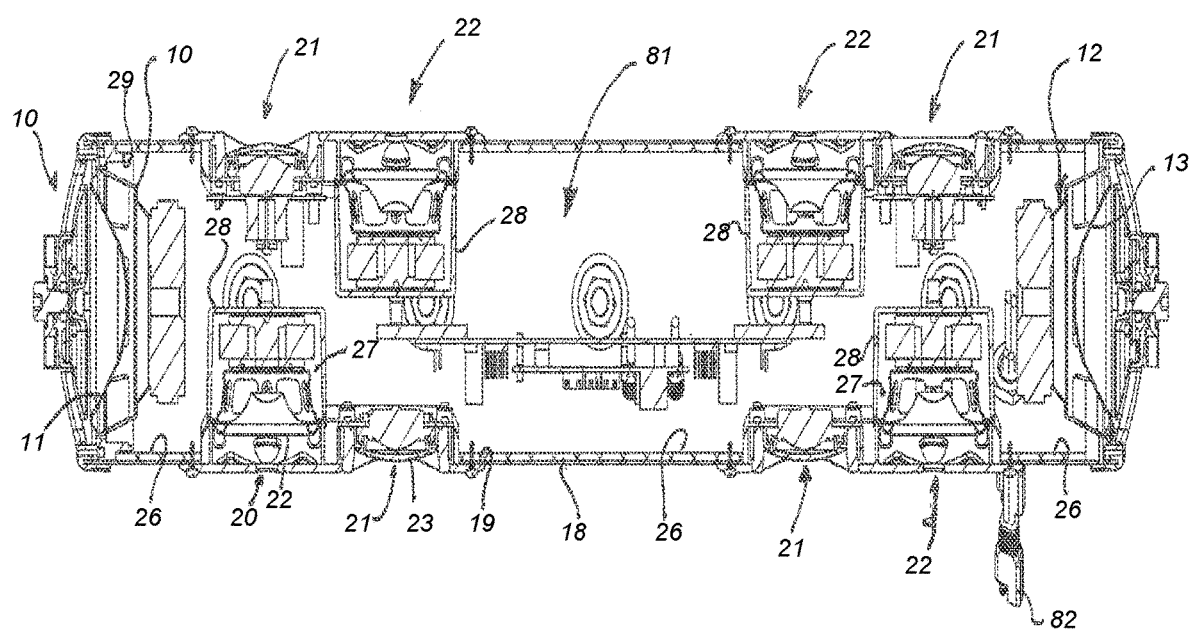
FIG. 5 is a cross-sectional view taken along lines I-I of FIG. 1 illustrating the positioning of the speakers and other electronic components within the housing cavity.
Figure 6:
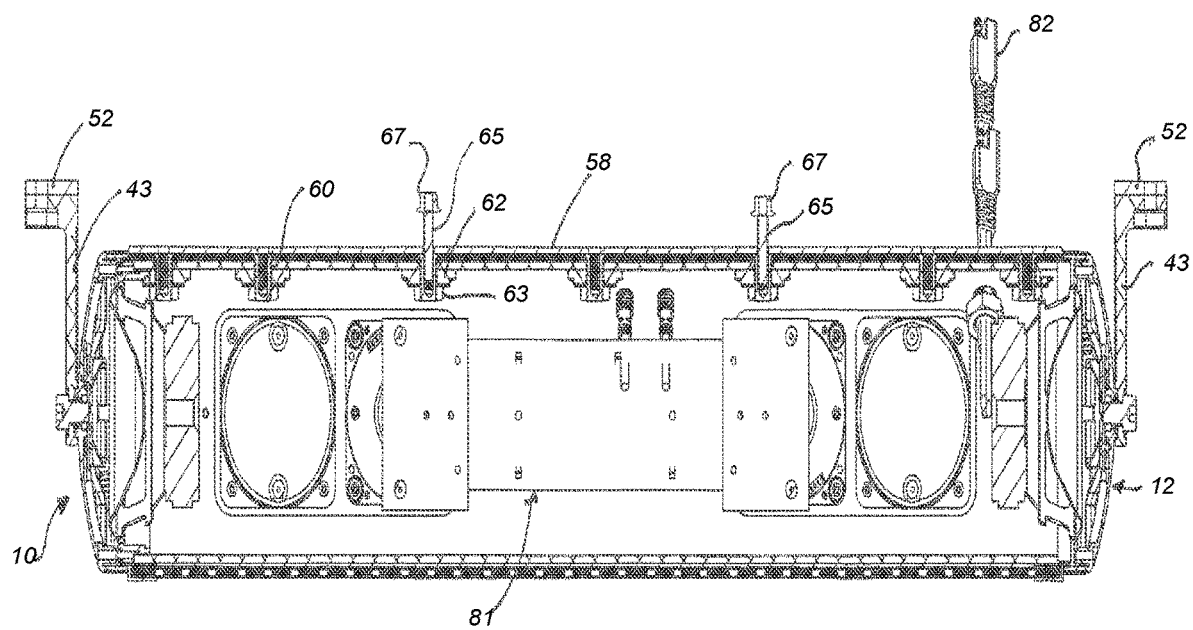
FIG. 6 is a cross-sectional view taken along lines II-II of FIG. 4 illustrating the positioning of the speakers and other electronic components within the housing cavity.
Figure 7:
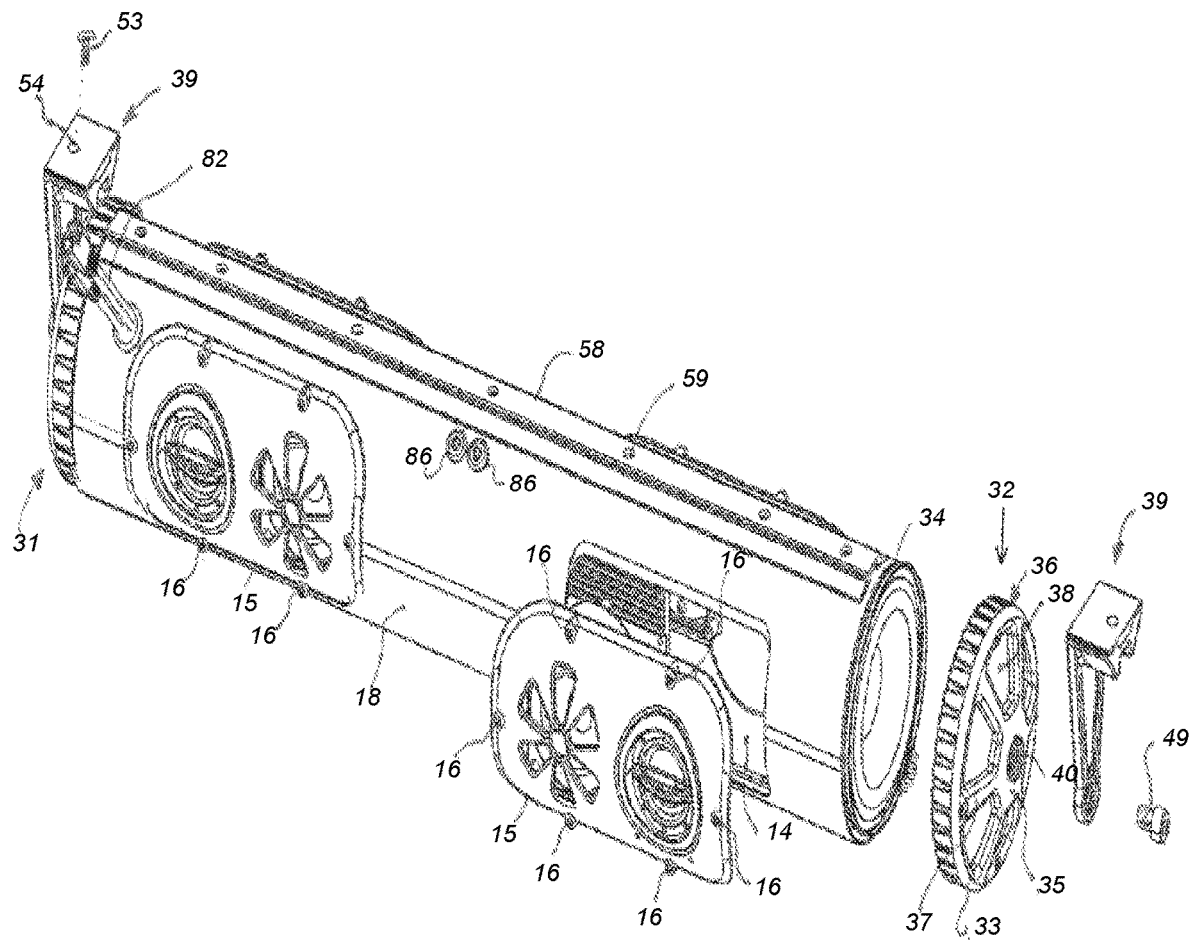
FIG. 7 is a partially exploded view of FIG. 1 illustrating one speaker array extended from the housing and one mounting assembly exploded from one of the end sections of the housing and modified to illustrate additional sockets to plug other devices to the sound bar and illustrating a different position for the power connection.
Figure 8:
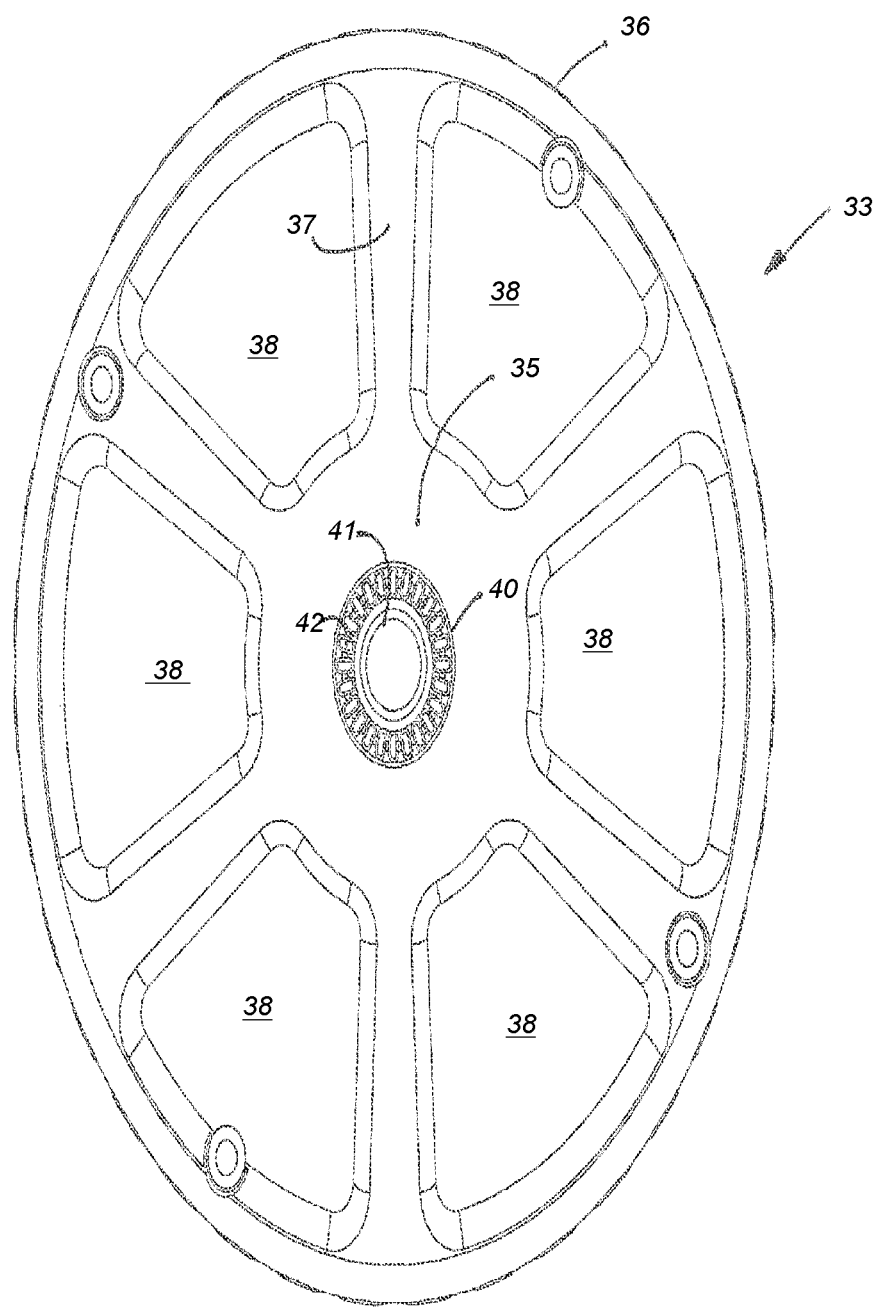
FIG. 8 is a front view of the end housing grill illustrating its spokes extending from a center hub section to the outer perimeter section to form openings for sound emitting from the base speaker to be broadcast through the grill, as well as illustrating the series of locking ridges surrounding the threaded bolt opening centered in the grill hub section.
Figure 9:
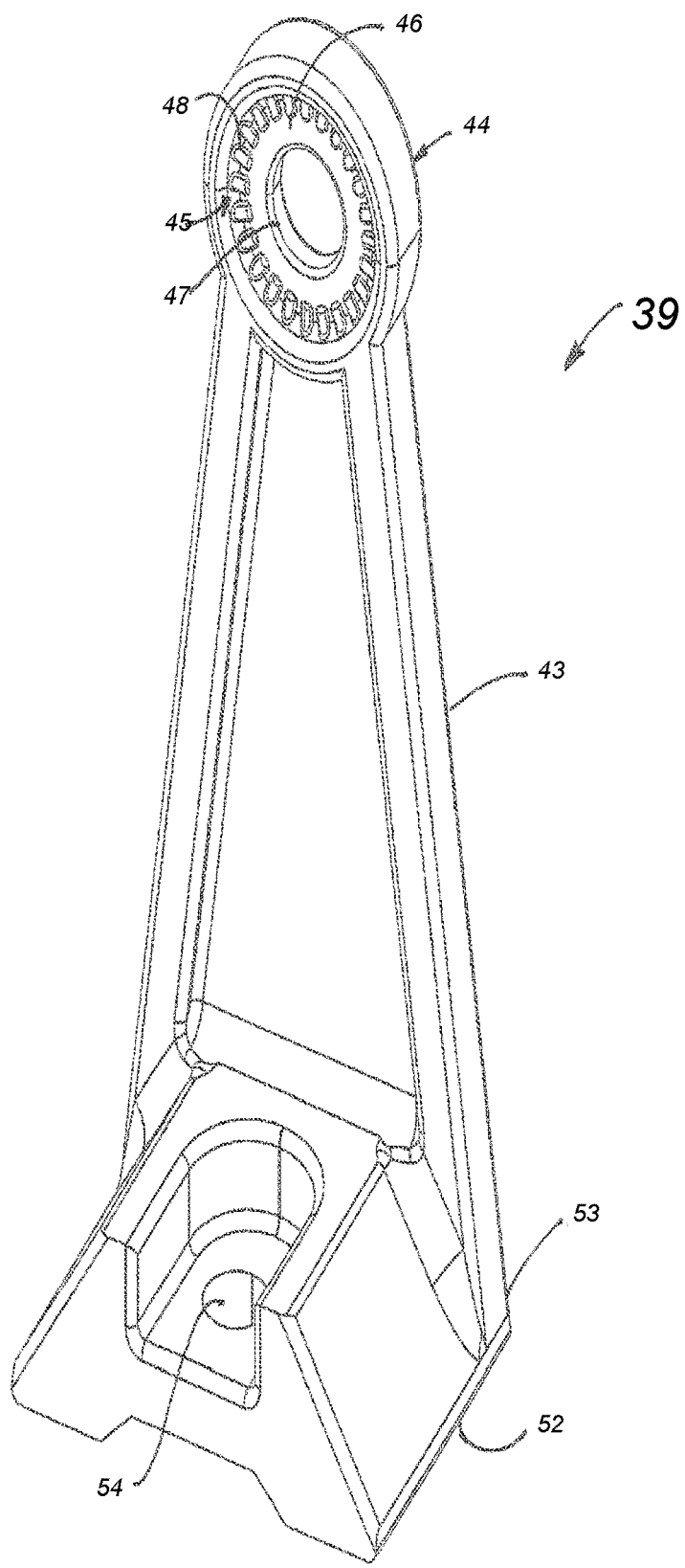
FIG. 9 is a three-quarter perspective view of the front surface of the L-shaped attachment member illustrating the upper bolt opening surrounded by a series of locking ridges that can mate in locking fashion with the grill hub section, as well as illustrating the short leg extending substantially perpendicular from the long leg of the attachment member and having a bolt opening for use in attaching the sound bar to the off-road vehicle or recreational watercraft.
Figure 10:
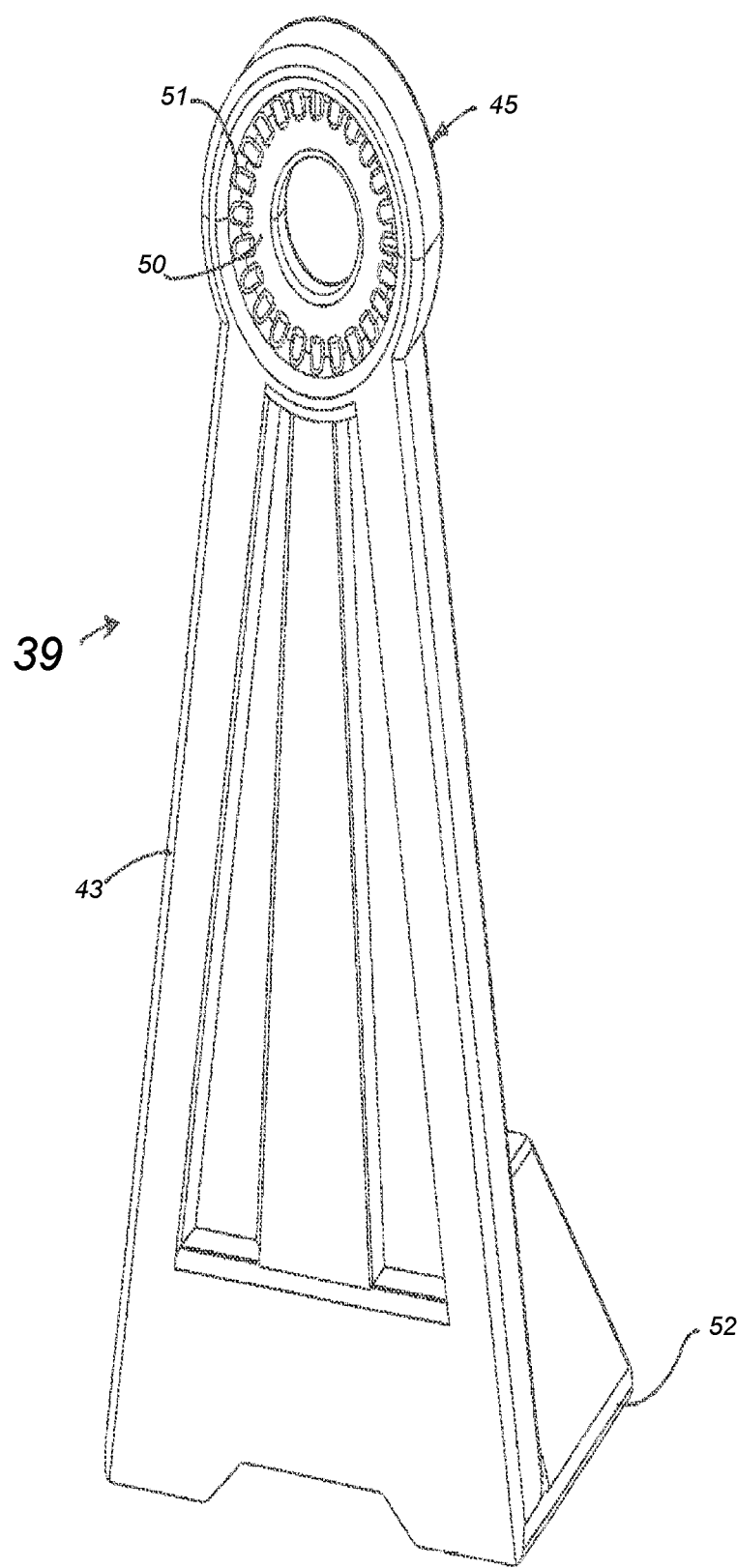
FIG. 10 is a three-quarter perspective view of the back surface of the L-shaped attachment member illustrating the upper bolt opening surrounded by another series of locking ridges that can mate in locking fashion with the grill hub section.

As seen in FIGS. 5 and 7, affixed to the interior surface 19 of face plate 16 is a mid-range speaker unit 20 and a tweeter speaker unit 21 whose faces 22, 23, respectively, are positioned to direct sound outward of housing 2 through openings 24, 25, respectively, in face plate 16.

It is preferred that each middle section speaker array assembly 15 include one or more mid-range speaker units 20 having a frequency range of 250-3,000 megahertz, and a tweeter speaker unit 21 having a frequency range of 3,000-20,000 megahertz. It is preferred the bass speaker units 10, 12 positioned in the opposing housing end sections 3, 4, respectively, will each have a frequency range of 37-250 megahertz, preferably 70-250 megahertz.

Positioning the bass speaker units 10, 12 in the opposing end sections 3, 4, respectively, increases the volume of air that will be compressed within the housing passageway 6 by the operation of the bass speakers 10, 12. This decreases the pressure on the housing internal wall surfaces 26 and permits the construction of a lighter housing 2. However, in this configuration it is preferred that the rear area 27 of the mid-range speaker units 22 be housed within a covering cap 28 to minimize interference by the back pressure of the operating bass speaker units 10, 12 positioned in the end sections 3, 4, respectively, of the sound bar housing 2. In a preferred embodiment the diameter of the bass speaker units 10, 12 is slightly smaller than the inside diameter of the housing 2 to facilitate obtaining a proper dust proof and watertight seal between the housing interior wall surface 26 and the outer perimeter wall surfaces 29, 30 of the bass speaker units 10, 12.

National standards have been established to indicate the degree of sealing against dust and similar solid particles, as well as sealing against water ingress into a product. In addition there are national standards relating to the mechanical impact resistance of a product. One such standard is the IEC standard 60529. Utilizing this standard it is desired the sound bar 1 of this invention have a solid particle rating of 4, preferably a rating of 5, and most preferably a rating of 6. It is further desired the sound bar 1 of this invention have a water ingress rating of 4, preferably a rating of 5 and more preferably a rating of 7. It is also desired that the sound bar 1 have a mechanical impact resistance rating of 5, preferably a rating of 7, and most preferably a rating of 9, particularly, if the sound bar 1 is to be mounted on an ATV or similar off-road vehicle.

Figure 2:
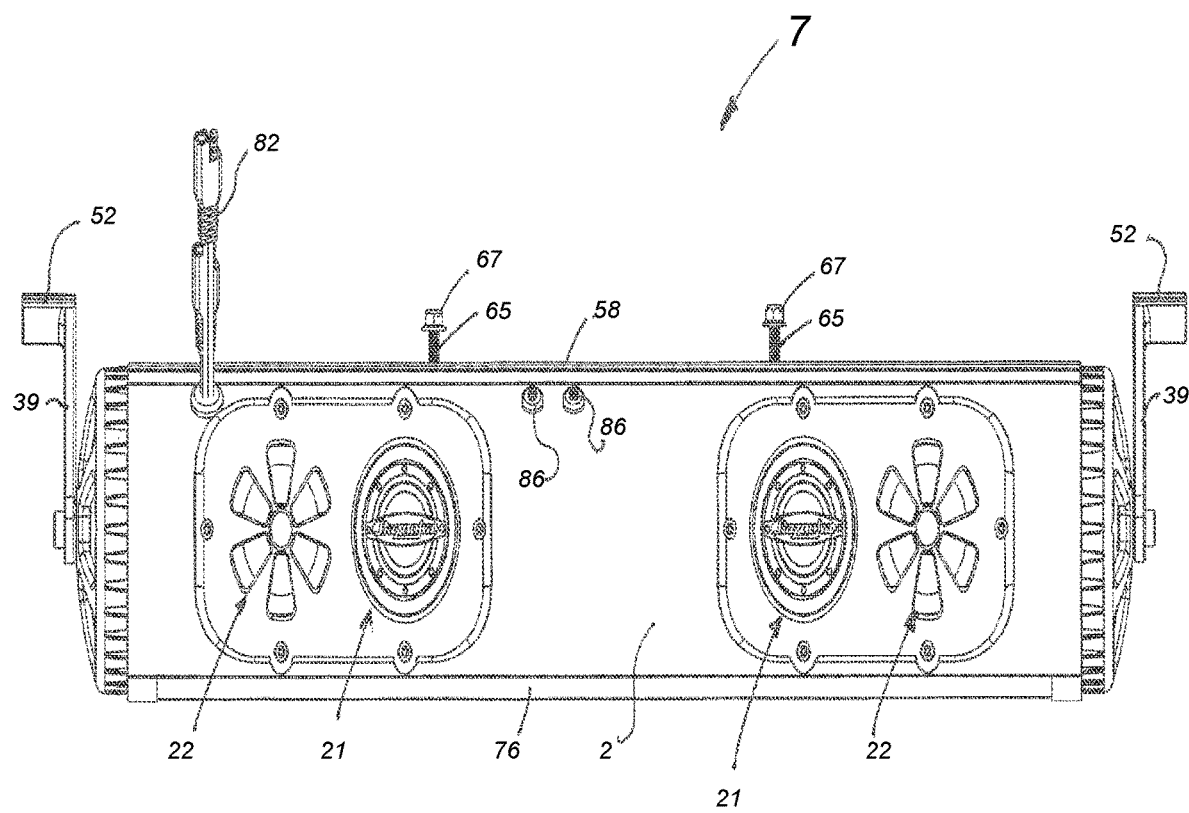
Figure 17:
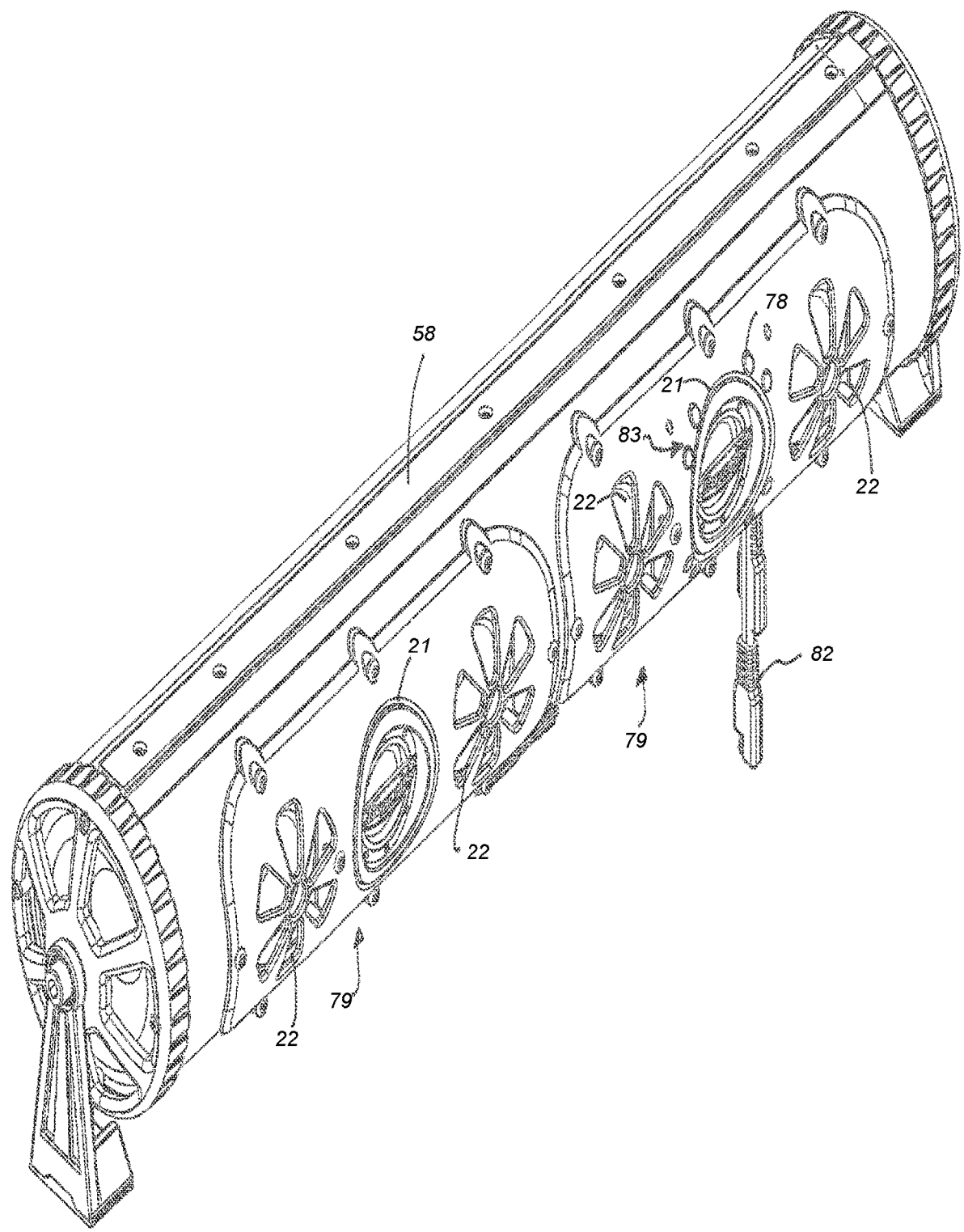
FIG. 17 is three-quarter front perspective view of an alternate speaker array for use when all of the speaker arrays face in the same direction, as well as an alternate strap assembly for affixing the attachment members to the sound bar housing.

The number and combination of tweeter speaker units 21 and mid-range speaker units 22 in an array assembly 15 may vary. The number of array assemblies 15 depends on the combination of speakers in each array assembly 15, the overall size of the sound bar 1 (as dictated by the land vehicle or watercraft in which the sound bar 1 is to be mounted) and the size of the selected tweeter and mid-range speaker units. For use in an off-road vehicle or recreational watercraft, it has been found in each array assembly 15 the use of one or two mid-range speaker units 22 to each tweeter speaker unit 21 provides a desired sound quality and volume when two to four array assemblies 15 are utilized. If the array assemblies 15 are to be positioned with each speaker unit facing in the same direction from the central longitudinal axis 7, then, as illustrated in FIG. 17, it preferred that two array assemblies be used having a "mid-range/tweeter/mid-range" configuration. On the other hand, if the array assemblies 15 are to be positioned to provide sound emanating from both the front and rear sides of the housing middle section 5, then it is preferred that four array assemblies 15 be used with each having a "mid-range/tweeter" configuration. In this latter embodiment, as illustrated in FIGS. 1, 2 and 5, the opposing array assemblies 15 are configured whereby the back of mid-range speaker unit 20 in one speaker array faces the back of the tweeter speaker unit 21 in the opposing array assembly. This configuration permits the housing 2 to be constructed having a smaller and more compact diameter while still providing sufficient space in the housing passageway 6 for other components, such as an electronic controller and its associated wiring (not shown), necessary to operatively connect to and control the function of the speaker units and any LED lighting assemblies, as well as to operatively connect to an external power source 82.

Referring to FIGS. 7-10, the sound bar 1 further comprises two mounting assemblies 31, 32 to attach the sound bar 1 to the recreational vehicle or watercraft. Each assembly 31, 32 includes a grill member 33 attached to the housing 2 forming a sealing arrangement about the perimeter 34 of one of the end sections 3, 4, respectively, of housing 2 and extending over the housing end section opening 8, 9, respectively. The grill member 33 is further constructed having a center hub area 35 affixed to an outer perimeter section 36 of the grill member 33 by spokes 37 defining open spaces 37 in the grill member 33 to permit the bass sound to emanate from the bass speaker unit 10, 12 and broadcast out of the end opening 8, 9, respectively. Each of assembly 31, 32 also includes a generally L-shaped mounting member 39 that is attachable to the center hub area 35. To achieve the desired 360 degree rotation of the sound bar 1 when it is mounted to the recreational vehicle or watercraft, the center hub area 35 includes a circular section 40 having a threaded central opening 41 surrounded by a series of separated ridges 42. The longer leg 43 forming the L-shaped mounting member 39 is provided at its top end section 44 with a corresponding circular section 45 having in one face 46 a central opening 47 surrounded by a series of separated ridges 48 that are shaped and positioned to securely fit into the separated ridges 42 of the center hub area 35 when a bolt 49 is passed through opening 47 and treaded into the treaded central opening 41. In a preferred embodiment the opposite face 50 of the longer leg circular section 45 also has a series of similar separated ridges 51 that can securely fit into the separated ridges 42 of the center hub area 35 when the longer leg is rotated 180 degrees. The shorter leg 52 forming the L-shaped mounting member 39 extends generally perpendicular from the bottom end section 53 of the longer leg 43 and is provided with a bolt opening 54 to accommodate a bolt 55 used to pass through opening 54 and screw into an opening on a vehicle or watercraft frame member (not shown) where it can be bolted to tighten the shorter leg 52 to the frame member. The second mounting assembly 32 is similarly constructed and attached to the other housing end section 4 and extending over the other housing end section opening 9. Each mounting assembly 31 and 32 can be attached to its respective hub area 35 with the shorter leg 52 extending outward from housing 2 or extending underneath the housing bottom surface, thus, providing additional flexibility in attaching sound bar 1 to the vehicle or watercraft.

As illustrated in FIGS. 1, 2, 4, and 7, in circumstances that do not require the sound bar 1 to be rotatable about its central horizontal axis 7 an alternate mounting assembly 57 may be utilized. This embodiment includes a rail member 58 affixed to the sound bar housing 2. Rail member 58 includes a series of spaced apart bolt openings 59. The spaced apart bolt openings 59 can be utilized to attach the railing 58 to the housing exterior surface or to attach accessories to the top of rail 58. Affixed below each opening 59, as illustrated in FIGS. 11-13, are blind insert assemblies 60 that permit a dust proof and watertight seal to be formed when the railing 58 it used to attach to the vehicle or watercraft or to attach accessories to the top of rail 58. Each blind insert assembly 60 includes a double threaded insert 61 having a head member 61A and internally and exteriorly threaded shaft 61B extending downward from head member 61A. Head member 61A is positioned between rail member 58 and housing outer surface 18 with insert shaft 61B extending through housing surface 18 and into passageway 6. Extending about the external threads 64 is spacer 62 shaped and positioned to contact the housing interior wall surface 26 when nut 63 is screwed on external threads 61C to affix insert assembly 60 to housing 2. When attaching bolt 65 is extended through the attaching surface of the vehicle or watercraft (not shown), then through rail member opening 60 and screwed on the insert internal threads 66 and tightened with external nut 67, rail member 58 is pressed against insert head 61A to form a watertight and dust proof seal.

Figure 14:
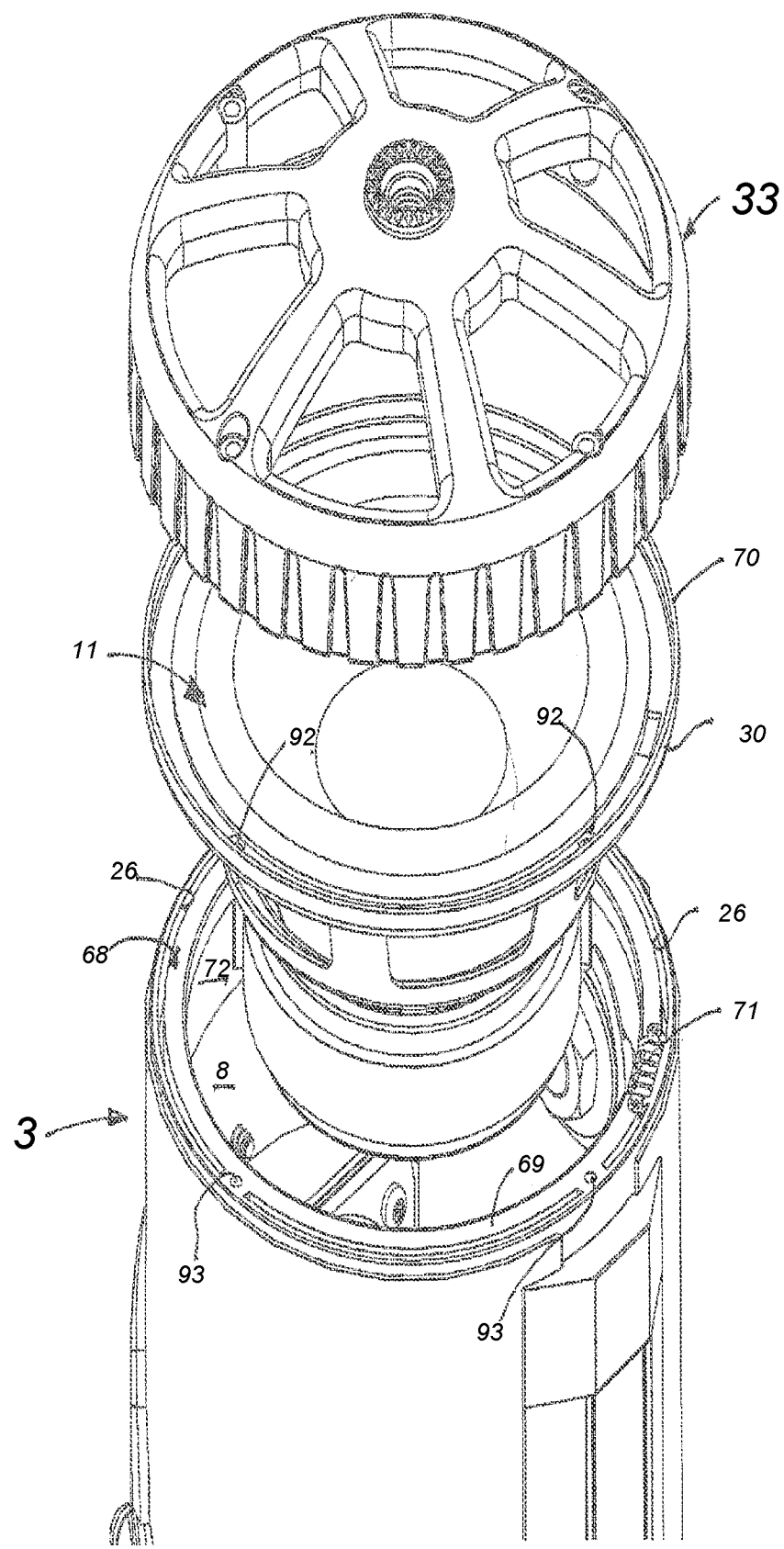
FIG. 14 is an exploded three-quarter top view of an end section of the sound bar housing illustrating the attachment of a bass speaker to seal the end section opening.

In a preferred embodiment illustrated in FIG. 14, housing end section 3 includes a support ring 68 extending across passage way end opening 8 to provide a seat 69 to which (by screws or other known attaching devices) bass speaker assembly 10 may be affixed. Outer rim 70 of bass speaker face 11 is shaped to form a watertight and dust proof seal with the interior housing surface 26. In one embodiment this seal is achieved by tightening screws 90 that extend through aligned grill member openings 91, outer rim openings 92 and then into support ring openings 93. In another preferred embodiment control module 81 is operatively connected by wiring (not shown) to electronic connector 71 that is affixed to support ring 68 and aligned with opening 72 in outer rim 70 to permit control module to provide power and operating control of any LED light strip that may be positioned on mounting grill member 33.

Figure 15:
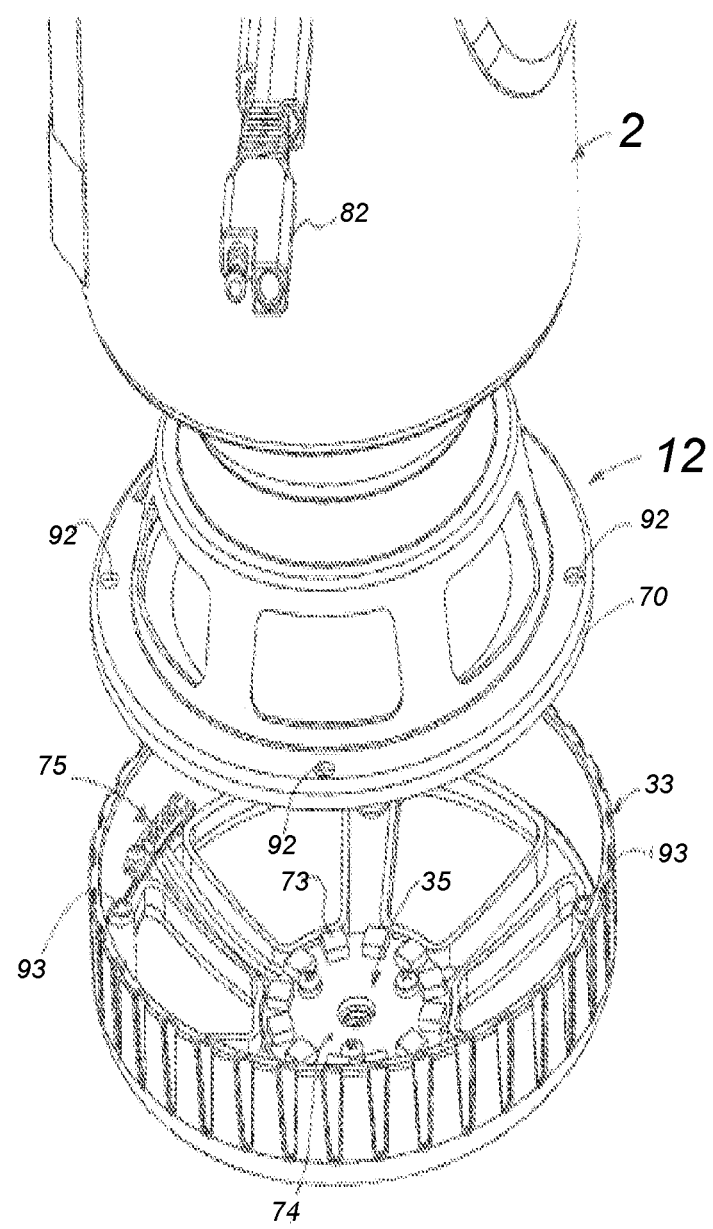
FIG. 15 is an exploded reverse view of FIG. 14.
Figure 16:
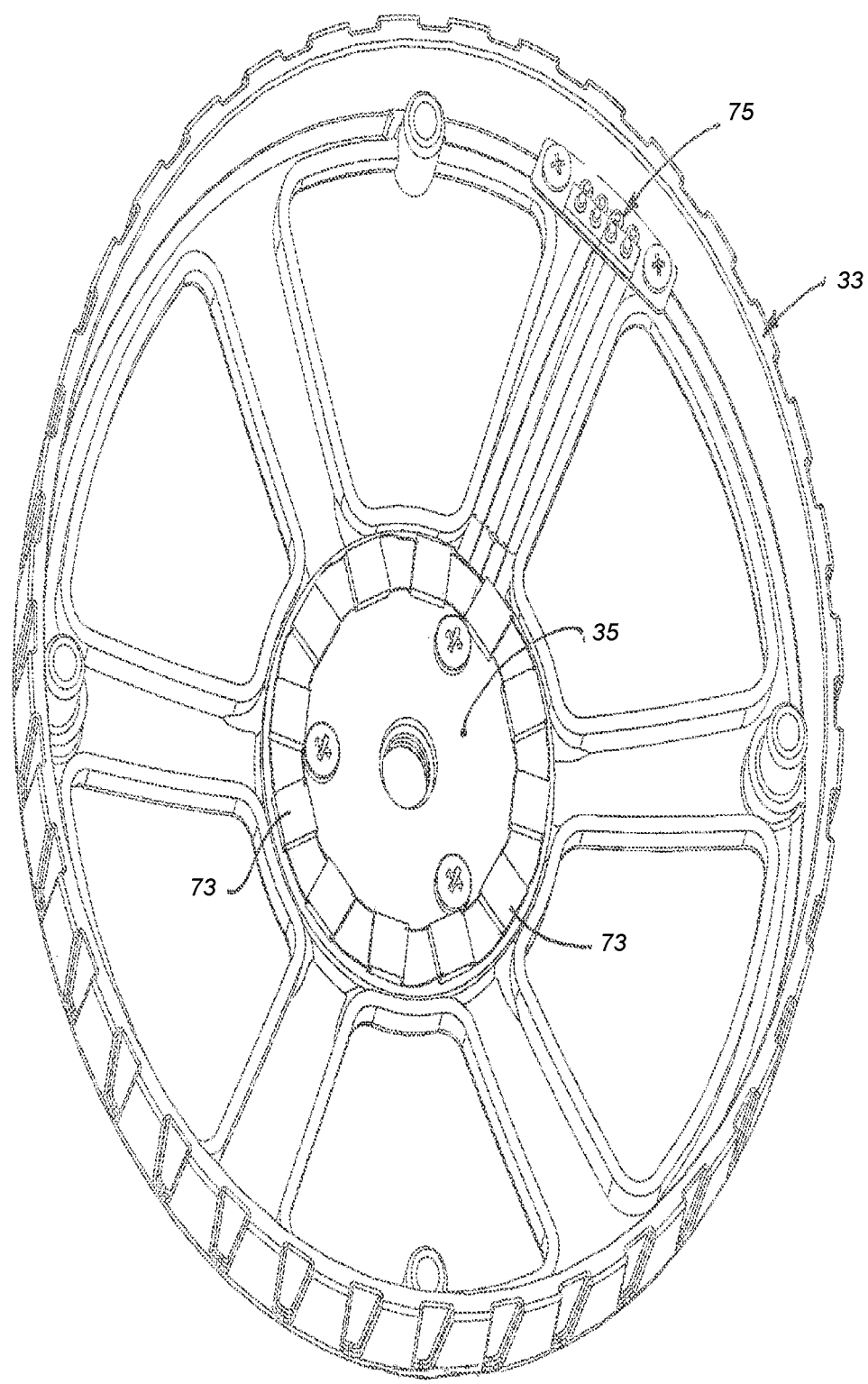
FIG. 16 is a three-quarter view of the rear side of the speaker grill having a LED light strip mounted to the center hub area.

Referring now to FIGS. 15-16, grill member 33 has a LED light strip 73 affixed on the interior surface 74 of grill member center hub area 35. LED light strip 73 has electronic control connector 75 positioned to be affixed to electronic connector 71 shown in FIG. 14. Thus control module 81 can provide the necessary power and control to operate LED light strip 73.

Figure 3:
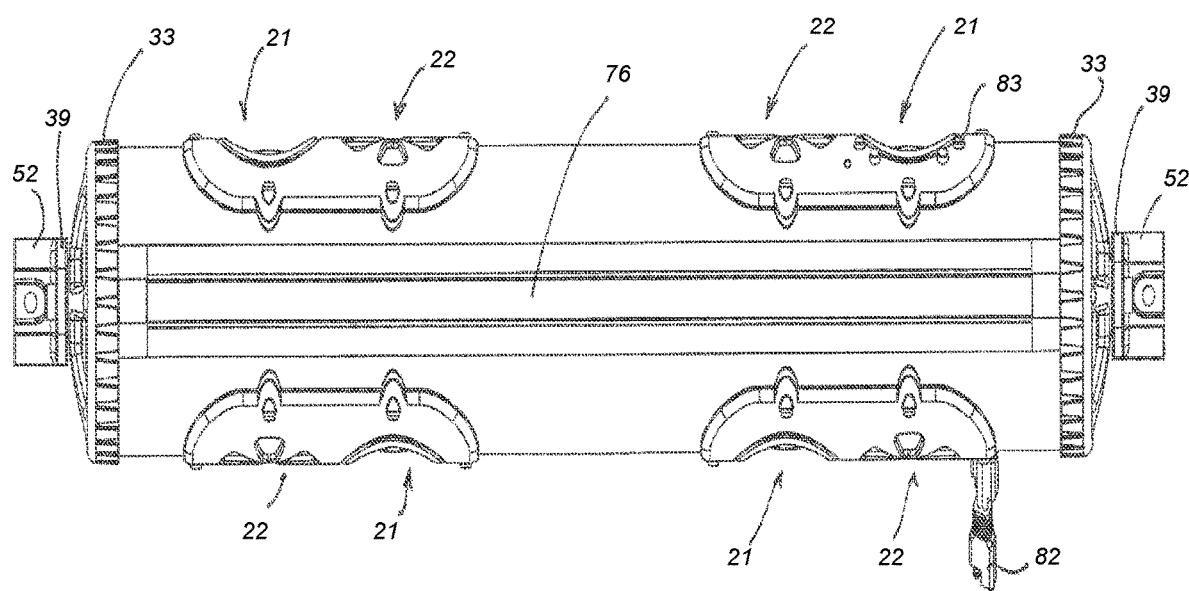
Figure 4:
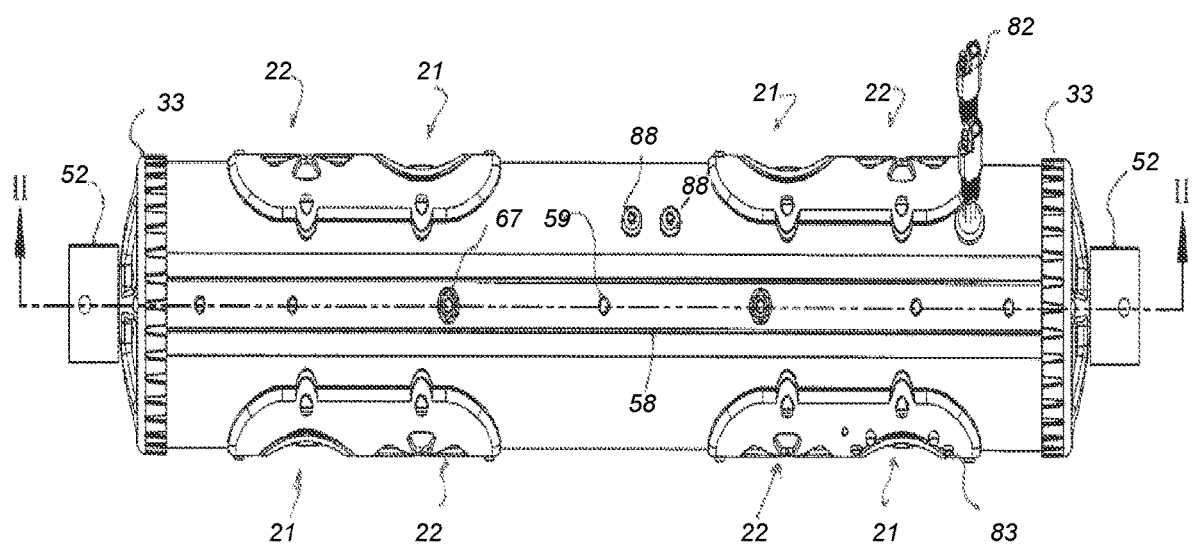

In an alternate preferred embodiment LED light strip 76 may be positioned on housing outer surface 18 such as illustrated in FIG. 3. In another preferred embodiment LED light strips may be positioned to provide light on manual operating controls 78 utilized to operate the speakers or lighting such as illustrated in FIGS. 1, 17-18.

Figure 18:
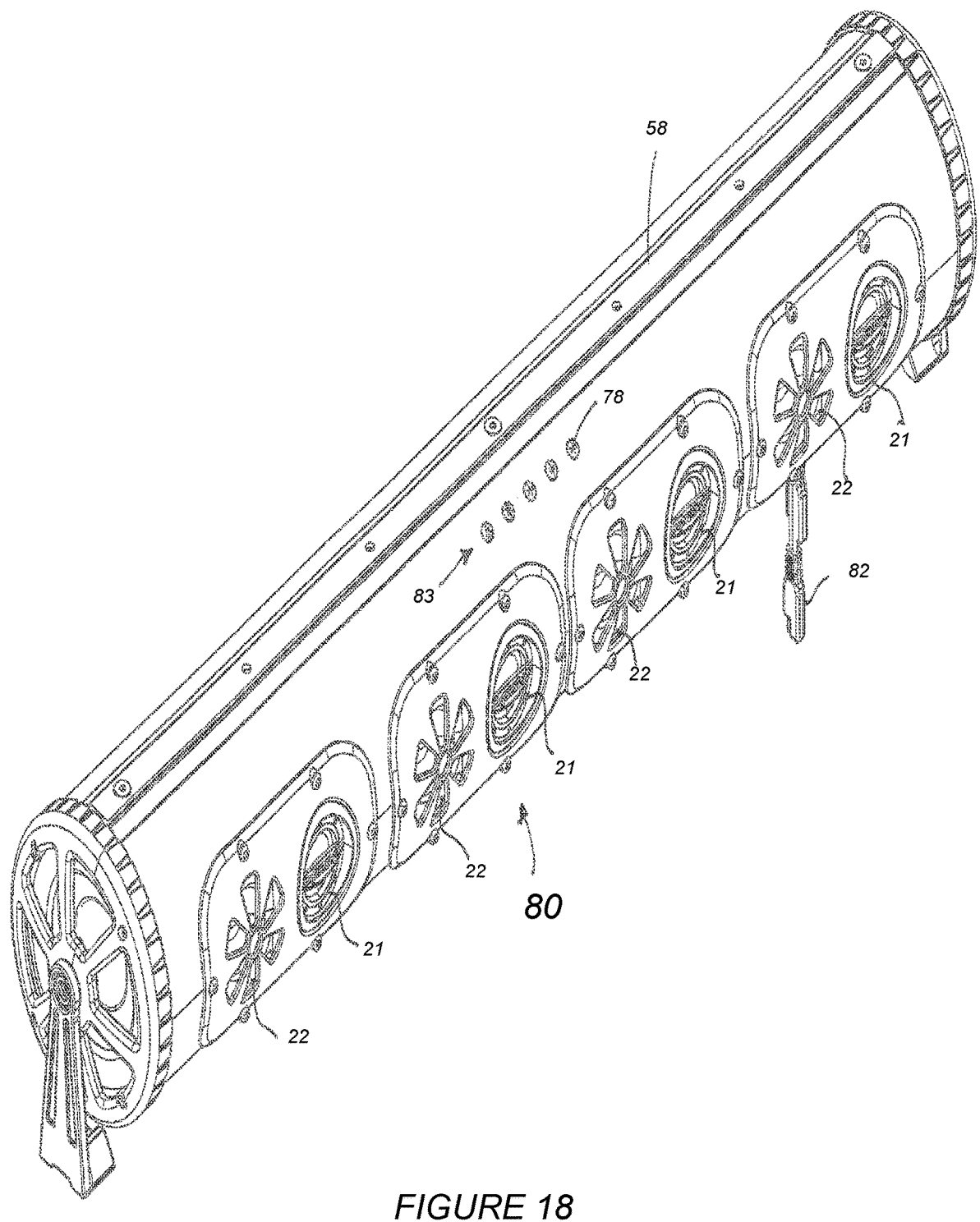
FIG. 18 is a three-quarter front view of an alternate speaker array assembly having a mid-range/tweeter speaker array design and illustrating an alternate positioning of the hard wired control panel operating function control buttons.

Referring to FIGS. 17-18 alternate speaker array assemblies are illustrated. In FIG. 17 each array assembly 79 includes a tweeter speaker unit 21 surrounded by two mid-range speaker units 22. In an alternate embodiment, additional similar speaker array assemblies 79 could be positioned on the opposite side opposing the front speaker array assemblies. In FIG. 18 there are four array assemblies similar to those shown in FIGS. 1-4. In an alternate embodiment a similar series of array assemblies could be positioned on the rear side of housing 2 so as to oppose the front side array assemblies in a manner similar to the array assemblies illustrated in FIGS. 1-4. However, in all alternative positions the bass speaker units 10, 12 are affixed in the housing end sections 3 and 4, respectively.

The controller module 81, and in turn speaker units 10-11 and 20-21, LED lighting strips 73, 76, are operatively attached to a power source (not shown), such as the battery of the land vehicle or watercraft. In a preferred embodiment the sound bar 1 is also provided with electrical connections 82 to permit the controller module 81 to be operatively attached to an external power source that may be located on a pier or at a camp where the watercraft is docked or where the land vehicle is parked.

In another novel feature of this invention control of sound bar 1 is achieved by three independent control devices that permit control of the sound bar 1 regardless of the environmental and/or physical constraints might be present when sound bar 1 is used with a recreational vehicle or watercraft.

The first control panel system 83 (see FIGS. 1, 17-18) are manual function control buttons 78 hardwired to controller module 81 and positioned on housing 2. The utility of this control panel system 83 depends in large part where the sound bar 1 must be attached to the recreational vehicle or watercraft.

Figure 19:
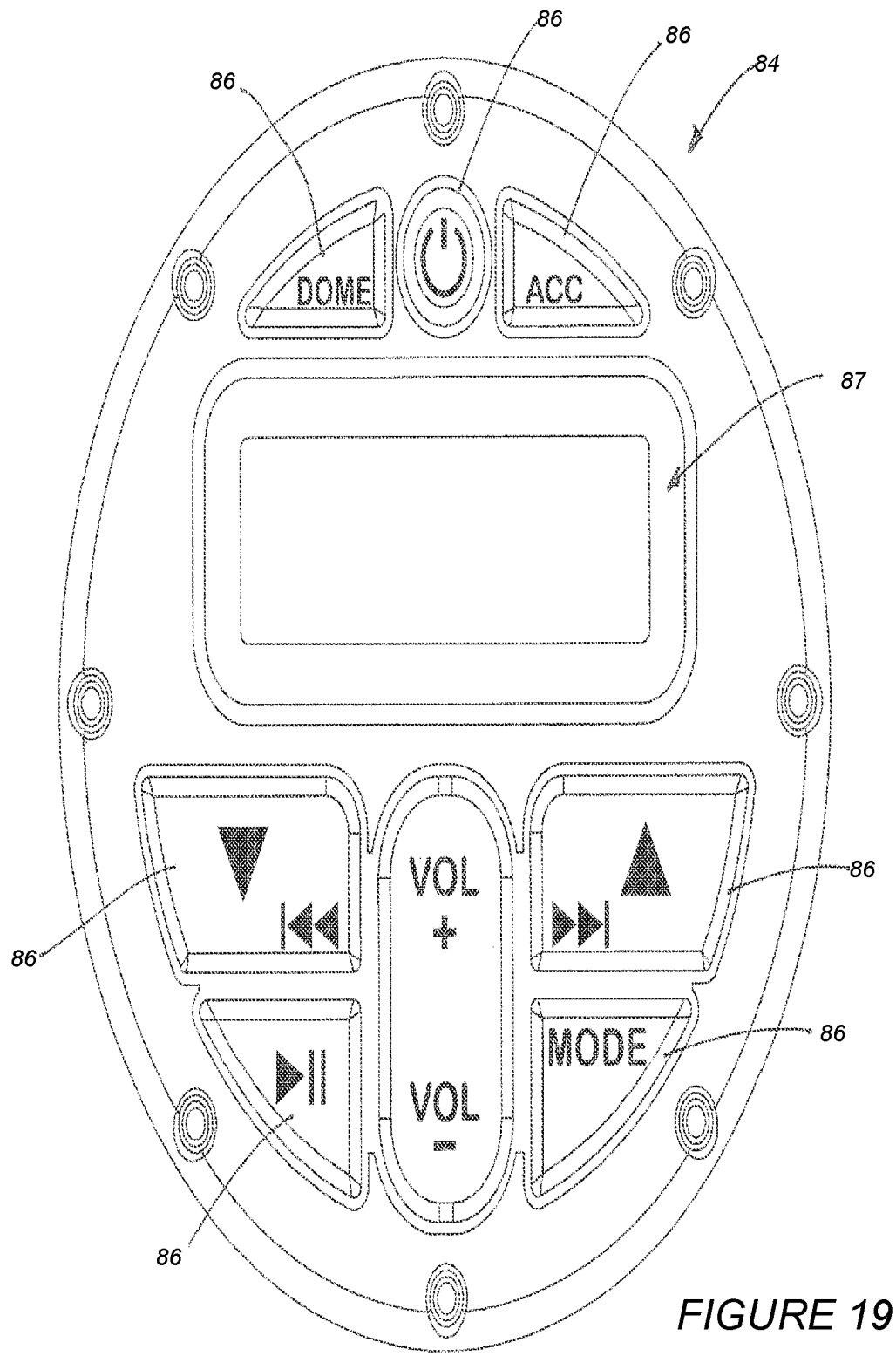
FIG. 19 is a front view of the remote, dashboard attached device for transmitting RF signals to the controller module used to operate the speakers and lighting.
Figure 20:
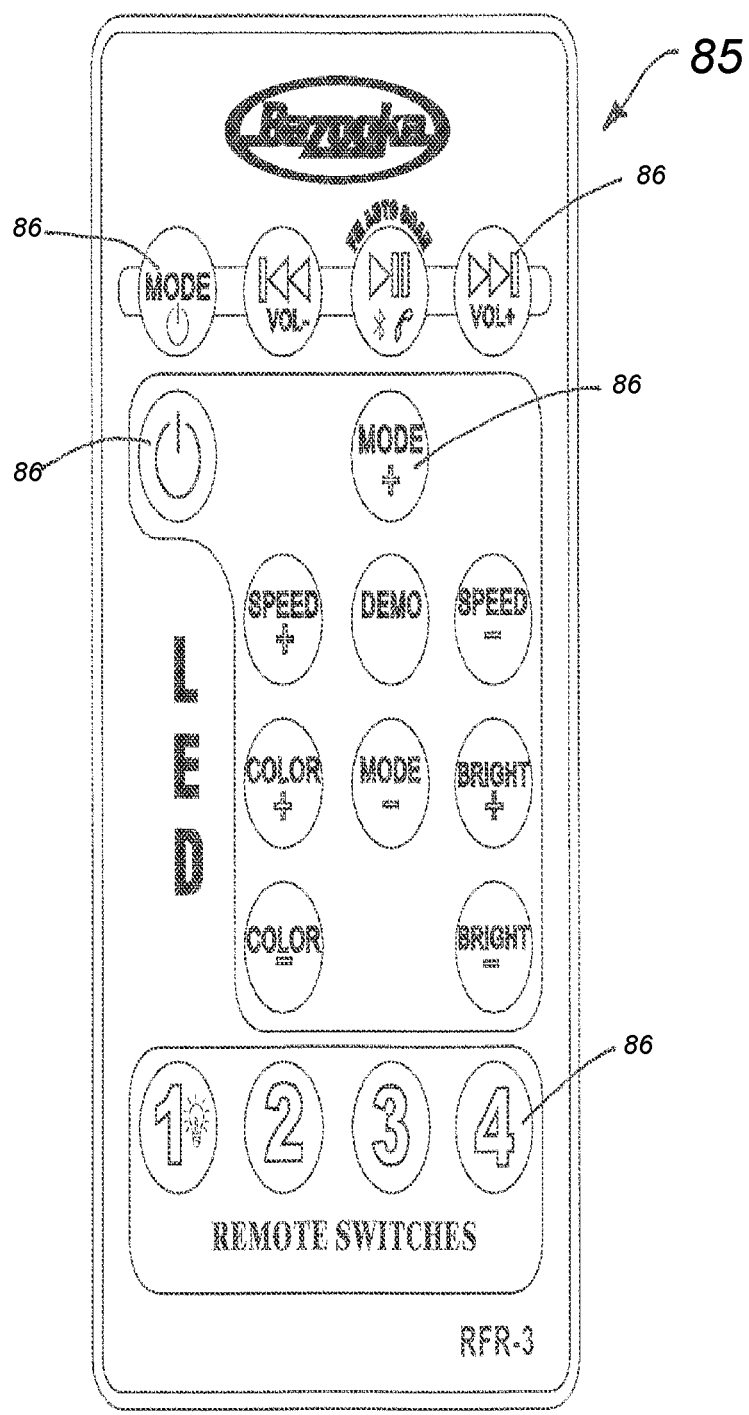
FIG. 20 is a front view of the remote, handheld device for transmitting RF signals to the controller module used to operate the speakers and lighting.

The second control panel system 84 (see FIG. 19) is mountable on the recreational vehicle or watercraft. In this system both the speaker and lights controller module 81 and the control panel system 84 are constructed to communicate utilizing conventional RF and Bluetooth remote control electronics. Because of its small size and the ability to communicate by RF and Bluetooth remote control electronics, the control panel system 84 can be mounted in more convenient places than control system 83. In an alternate embodiment multiple control panel systems 84 because they communicate independently with controller module 81 can be mounted in various locations on the recreational vehicle or watercraft providing even additional flexibility and control of the sound and lights of the sound bar 1.

The third control panel system 85 is a handheld RF, Bluetooth equipped remote controller or a smart phone in which a control app has been downloaded having the capabilities of transmitting desired function control signals to the controller module 81. In addition control panel system 85 is programmed to both transmit operating function control signals to controller module 81, but also to receive desired information from controller module 81. Controller systems 84 and 85 will each have multiple function control buttons 86 to control the sound source selection, sound volume, LED lights, and any other device that may be operatively attached to plugs 88 that are operatively connected to control module 81. In an alternative embodiment it may be provided with screen 87 to display information related to the operation of controller 84 or 85, or any other desired information.

In another preferred embodiment the electronic controller module 81 is mounted within the housing passageway 6 and operatively attached to the speaker units and any LED lighting strips that have been incorporated in the sound bar 1. The controller module 81 is designed to receive control signals from a keypad panel having operating function control buttons 83 affixed to the external surface 26 of the housing 2. The controller module 81 is further designed to receive RF control signals from a remote device that is mounted to the land vehicle or watercraft or is handheld. In an alternate preferred embodiment the remote device, such as control panel systems 84 and 85, may be Bluetooth enabled in order to have two-way communications with the controller module 81. Still further the controller module 81 is designed to receive Bluetooth control signals from a smart phone app and to communicate back to the smart phone app or remote device that it has received and executed the desired instructions. Messages from the controller module 81 may be displayed on a screen 87 or otherwise viewed. This controller module 81 combination provides significant benefits to the ATV/watercraft sound bar. Because of the limited mounting positions the sound bar 1 may be affixed to the ATV or watercraft in positions where it is difficult to reach manual control buttons 83 located on the sound bar housing 2. In these situations the smart phone app and the remote RF/Bluetooth devices provide alternate means to operate the sound and light controls of the sound bar 1. However, in severe weather or where the ATV or watercraft is traveling through rough water or muddy terrain the risk that the operator may drop and/or damage a smart phone, the relatively inexpensive remote device 85 allows the operator to safely store the cell phone and still operate the sound bar 1 by the remote device 85.

When the sound bar 1 is to be used in low light or dark conditions it is preferable that the sound bar 1 also be operatively equipped with lighting strips, such as LED lighting strips 73, operatively attached to the power source. These lighting strips can be positioned on the exterior surface 26 of the housing 2, and, if desired, also within the hub 35 of the grill members 33. In these positions the lighting strips can provide light as a decorative feature or to illuminate the speaker controls positioned on the exterior surface of the housing. The lighting strips (preferably LED strips) are operatively connected to the control module 81. If the lighting strips are hardwired directly to the controller module 81, then the wiring at the point of entering the housing passageway 6 are sealed by known means to maintain the dust proof and watertight construction. It is preferred to use a connector to a known PCB arrangement that allows for complete waterproofing and less mess. One such known arrangement utilizes spring loaded pins to maintain the connection. Another such arrangement would include plug and socket connecters.

The invention further includes a method of installing a sound bar 1 and mounting assembly 31 to a structure comprising selecting a structure to which the sound bar 1 is to be attached; loosely affixing with threaded bolt 49 a L-shaped mounting member 39 to a first housing end grill member 33; loosely affixing a second L-shaped mounting member 39 to a second housing end grill member 33; affixing the first L-shaped mounting member 39 to the structure; affixing the second L-shaped mounting member 39 to the structure; rotating the housing 2 about its horizontal axis 7 to a desired position; tightening the first L-shaped mounting member 39 to the first housing end grill member 33 an amount necessary to prevent further rotation of the housing 2; and tightening the second L-shaped mounting member 39 to the second housing end grill member 33 an amount necessary to secure the housing 2 to the L-shaped mounting member 39 and prevent further rotation of the housing 2.

I claim:

1. A sound bar for attachment to a recreational vehicle or watercraft comprising:
   an elongated housing having a first end opposite a second end and a middle section disposed between said first end and second end, the middle section having a generally circular or polygonal cross section along a central longitudinal axis;
   wherein the elongated housing comprises an array of speakers selected from the group consisting of midrange speakers, tweeters, and combinations thereof, wherein the array of speakers is positioned in the middle section and oriented to emit sound in a direction outward from the central longitudinal axis;
   wherein the elongated housing further comprises a bass speaker positioned in one end of the elongated housing and wherein said bass speaker is positioned to emit sound in a direction outward from said elongated housing and in line with the central longitudinal axis;
   wherein the sound bar further comprises a first mounting assembly and a second mounting assembly, wherein said first and second mounting assemblies are configured to secure said sound bar to said recreational vehicle or said watercraft and wherein said first mounting assembly and said second mounting assembly are positioned and configured to support the sound bar on a horizontal axis aligned with said central longitudinal axis of said elongated housing and wherein said first mounting assembly and said second mounting assembly are configured to allow said sound bar to be rotably positioned around said horizontal axis to direct the sound emitted from the array of speakers in a desired direction.

2. The sound bar for attachment to a recreational vehicle or watercraft according to claim 1 further comprising a plurality of arrays of speakers, wherein each array of speakers is selected from the group consisting of midrange speakers, tweeters, and combinations thereof.

3. The sound bar for attachment to a recreational vehicle or watercraft according to claim 2 wherein the plurality of arrays of speakers are each positioned in the middle section and oriented to emit sound in a direction outward from the central longitudinal axis.

4. The sound bar for attachment to a recreational vehicle or watercraft according to claim 3 wherein at least two of the plurality of arrays of speakers are positioned to emit sound in opposite directions.

5. The sound bar for attachment to a recreational vehicle or watercraft according to claim 1 further comprising a control module operatively attachable to a power source, the control module operatively connected to the speaker array and the first and second bass speakers and configured to control the volume of sound emitted by the speaker array and the first and second bass speakers.

6. The sound bar for attachment to a recreational vehicle or watercraft according to claim 5 wherein the control module has RF enabled electronic components configured to receive operating signals from a remote control.

7. The sound bar for attachment to a recreational vehicle or watercraft according to claim 6 wherein the RF enabled electronic components are Bluetooth enabled.

8. The sound bar for attachment to a recreational vehicle or watercraft according to claim 7 wherein the remote control is a smart phone.

9. The sound bar for attachment to a recreational vehicle or watercraft according to claim 5 further comprising an LED light strip operatively attachable to the power source and operatively connected to the control panel.

10. The sound bar for attachment to a recreational vehicle or watercraft according to claim 5 wherein the power source is a battery in the recreational vehicle or watercraft.

* * * * *